United States Patent [19]
Ashton

[11] Patent Number: 5,900,194
[45] Date of Patent: May 4, 1999

[54] METHOD FOR REMOVING MANDRELS FROM COMPOSITE TUBES OF SUBSTANTIAL LENGTH

[75] Inventor: Clint Ashton, Ephraim, Utah

[73] Assignee: Wasatch Technologies Corporation, Ephraim, Utah

[21] Appl. No.: 08/753,646

[22] Filed: Dec. 27, 1996

[51] Int. Cl.⁶ .................................................. B27N 5/02
[52] U.S. Cl. ........................... 264/39; 264/313; 264/257; 264/334
[58] Field of Search ................. 264/39, 512, 137, 264/573, 171.26, 313, 314, 257, DIG. 25, DIG. 64, DIG. 65, 334; 156/173

[56] References Cited

U.S. PATENT DOCUMENTS

| | | |
|---|---|---|
| 2,272,704 | 2/1942 | Harding . |
| 2,724,673 | 11/1955 | Hunter . |
| 2,794,481 | 6/1957 | Anderson . |
| 2,970,343 | 2/1961 | Johnson et al. . |
| 3,165,569 | 1/1965 | Bright ................................ 264/313 |
| 3,265,795 | 8/1966 | Medney ............................. 264/313 |
| 3,270,111 | 8/1966 | Haldemann ....................... 264/137 |
| 3,316,337 | 4/1967 | North ................................ 264/313 |
| 3,669,364 | 6/1972 | Sinizer et al. ........................ 242/1 |
| 3,755,037 | 8/1973 | Erwin et al. ...................... 264/314 |
| 3,902,944 | 9/1975 | Ashton et al. .................... 156/156 |
| 3,943,020 | 3/1976 | Ashton et al. .................... 264/137 |
| 3,999,912 | 12/1976 | Hall . |
| 4,126,659 | 11/1978 | Blad ................................. 264/573 |
| 4,144,632 | 3/1979 | Stroupe ............................ 264/314 |
| 4,158,586 | 6/1979 | Usui ................................. 264/137 |
| 4,298,330 | 11/1981 | Davis . |
| 4,584,041 | 4/1986 | Lyman et al. .................... 264/512 |
| 4,902,386 | 2/1990 | Herbert et al. ....................... 204/9 |
| 4,971,846 | 11/1990 | Lundy . |
| 5,000,990 | 3/1991 | Freeman .......................... 264/313 |
| 5,071,506 | 12/1991 | Nelson et al. . |
| 5,123,990 | 6/1992 | Roach . |
| 5,160,671 | 11/1992 | Satoh . |
| 5,221,016 | 6/1993 | Karpal ............................. 215/12.2 |
| 5,221,391 | 6/1993 | Kittaka et al. . |
| 5,225,021 | 7/1993 | Lona . |
| 5,256,230 | 10/1993 | Winkel . |
| 5,266,139 | 11/1993 | Yokota et al. . |
| 5,371,934 | 12/1994 | Mang ............................... 264/573 |
| 5,484,498 | 1/1996 | Hogarth et al. .................. 264/257 |
| 5,487,806 | 1/1996 | Viellard . |
| 5,571,357 | 11/1996 | Darrieux et al. . |
| 5,575,875 | 11/1996 | Brittingham et al. . |

*Primary Examiner*—Jill L. Heitbrink
*Attorney, Agent, or Firm*—Thorpe, North & Western, LLP

[57] ABSTRACT

A method for facilitating removal of a mandrel in the manufacture of hollow composite structures. A mandrel of substantially constant diameter is selected having a composition and coefficient of thermal expansion sufficient to enable it to expand when subjected to an elevated temperature. The mandrel is preheated to at least a predetermined minimum elevated temperature to thereby expand the mandrel radially outwardly. Composite material is wound around the mandrel while the mandrel has a temperature of at least the predetermined minimum elevated temperature. The composite material is then cured using any suitable curing technique. When the composite material has been cured, the mandrel is cooled to contract the mandrel radially inwardly, and the mandrel is removed from the composite material. This method of manufacture and removal is so effective that mandrels of constant diameter have been removed by hand from composite tubes of thirty feet in length.

36 Claims, 1 Drawing Sheet

METHOD FOR REMOVING MANDRELS FROM COMPOSITE TUBES OF SUBSTANTIAL LENGTH

BACKGROUND OF THE INVENTION

1. The Field of the Invention

The present invention relates generally to the manufacture of composite tubes. More particularly, it concerns a solution to the problem of mandrel removal in the manufacture of filament wound composite tubes having a substantially constant inner diameter.

2. The Background Art

The challenges of mandrel removal in the manufacture of composite tubes are well known to those of ordinary skill in the art. A composite tube is typically constructed by winding fibrous material impregnated with a resin onto a mandrel and curing the resulting composite material while it is on the mandrel. After the composite tube is cured, the mandrel is removed.

Long composite tubes, i.e., those more than about six feet in length, are quite difficult to remove from the cured composite tube is the diameters of the mandrel and tube are substantially constant. It is known to produce the mandrel with a slightly tapered exterior which aids greatly in mandrel removal. The resulting composite tube will then be formed with a taper as well.

However, some applications simply require the composite tube to have a substantially constant diameter. Mandrel extraction devices have been designed to apply several thousand pounds of force to the cured composite tube to remove it from the mandrel. Such devices are typically designed to hold the mandrel firmly and pull the cured composite tube using hydraulic power.

Unfortunately, the presently known mandrel extraction devices are characterized by several disadvantages. The large tensile force used to pull the composite tube from the mandrel sometimes weakens and damages the composite tube. Further, the prior art mandrel extraction techniques known to applicant are simply not capable of removing composite tubes longer than about eight to ten feet that have been cured upon mandrels of substantially constant diameter.

OBJECTS AND SUMMARY OF THE INVENTION

It is therefore an object of the present invention to provide a method of removing mandrels from cured composite tubes that is simple in application.

It is another object of the invention to provide such a method that is less likely to damage the cured composite tube.

It is a further object of the invention to provide such a method capable of extracting a mandrel of substantially constant diameter from a cured composite tube that is longer than fifteen feet.

It is an additional object of the invention to provide such a method that is capable of enabling manual removal of a mandrel of substantially constant diameter by hand from a cured composite tube that is longer than fifteen feet, without using extraction devices.

It is still another object of the invention to provide such a method that is less expensive.

The above objects and others not specifically recited are realized in a specific illustrative embodiment of a method for facilitating removal of a mandrel in the manufacture of hollow composite structures. A mandrel of substantially constant diameter is selected having a composition and coefficient of thermal expansion sufficient to enable it to expand when subjected to an elevated temperature. The mandrel is preheated to at least a predetermined minimum elevated temperature to thereby expand the mandrel radially outwardly. Composite material is wound around the mandrel while the mandrel has a temperature of at least the predetermined minimum elevated temperature. The composite material is then cured using any suitable curing technique. When the composite material has been cured, the mandrel is cooled to contract the mandrel radially inwardly, and the mandrel is removed from the composite material. This method of manufacture and removal is so effective that mandrels of constant diameter have been removed by hand from composite tubes of thirty feet in length.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF PRESENTLY PREFERRED EMBODIMENTS

Figure 1:
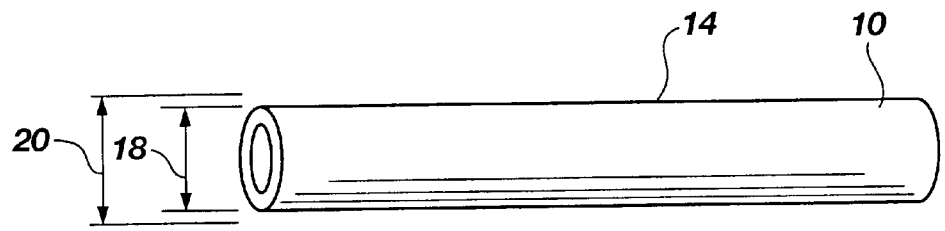
FIG. 1 is a side view of a hollow cylindrical mandrel of substantially constant diameter for use in accordance with the principles of the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated apparatus, and any additional applications of the principles of the invention as illustrated herein, which would normally occur to one skilled in the relevant art and possessed of this disclosure, are to be considered within the scope of the invention claimed.

Applicant has discovered some novel concepts which aid greatly in mandrel removal as part of a manufacturing process of composite tubes. A mandrel of constant diameter is selected having a composition and coefficient of thermal expansion sufficient to enable the mandrel to expand when subject to an elevated temperature. The mandrel is preheated and caused to expand before winding resin-impregnated filament upon it. The resin-impregnated filament is then wound upon the mandrel in its expanded state and cured thereon.

The resulting composite tube is then cured using any suitable curing technique, after which the composite tube and mandrel are cooled. The cooling action causes the mandrel to shrink, rendering it easily removable since the composite material was wound upon the preheated, radially expanded mandrel and was therefore formed to have a larger diameter to begin with. In fact, the mandrel is manually removable by hand, and thus without any need for extraction devices.

This preheating and winding technique avoids the problems caused by winding the composite material first and heating the mandrel second, which expands the mandrel directly against the wound composite, stretching it radially outwardly and thereby locking it upon the mandrel. The present inventive methods and apparatus permit the manufacture of tubular composite members well in excess of 15 feet in length. In fact, applicant is currently producing 31-foot tubular composite members of constant diameter with this process, and is not yet aware of any limitation on length.

Referring now to FIG. 1, the invention contemplates selecting a mandrel 10, preferably having a coefficient of thermal expansion that is greater than the coefficient of thermal expansion of composite material to be cured thereon. Preferably, the mandrel is hollow and made of aluminum, and is first preheated before any composite material is applied thereto.

Figure 2:
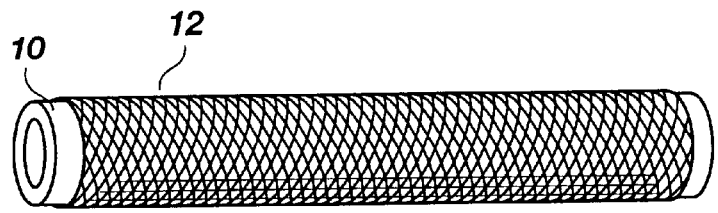
FIG. 2 is a side view of a composite tube formed upon the mandrel of FIG. 1.

As shown in FIG. 2, composite material 12 is then wound about the preheated mandrel 10, after which the composite material 12 is cured using conventional curing methods. The composite material preferably comprises resin-impregnated filament, most preferably part of a wet filament winding procedure.

By pre-heating the aluminum mandrel 10, the mandrel is caused to expand radially outwardly before the composite material 12 was wound upon it. The composite material should have a coefficient of thermal that is less than the coefficient of thermal expansion of the mandrel 10. After the composite material 12 is cured, the mandrel 10 and composite material 12 are cooled, which has the effect of shrinking the mandrel 10 to a greater extent than shrinkage of the cured composite material 12 because the coefficient of thermal expansion of the aluminum mandrel 10 is greater than the coefficient of thermal expansion for the composite material 12.

Figure 3:
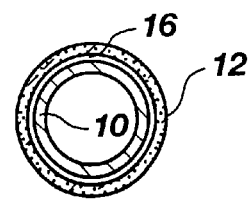
FIG. 3 is an end view of the composite tube and mandrel of FIG. 2, in a cooled state.

After cooling, the mandrel 10 is easily removable because it has shrunk to an outer diameter which is slightly smaller than the inner diameter of the tubular composite member 12, as illustrated most clearly by the gap or space 16 in FIG. 3. This is also illustrated in FIG. 1 by an initial diameter 18 of the mandrel 10 that corresponds to a first circumference of the mandrel 10 before it has been preheated, and an expanded diameter 20 accomplished by preheating the mandrel 10.

The aluminum mandrel 10 is preferably anodized using any suitable anodizing technique known in the art for toughening and hardening the exterior surface of the mandrel 10. This is sometimes called "hard black anodizing" that causes the exterior surface of the mandrel 10 to turn black, although some anodizing causes other coloring such as a milky, off-white color. Applicant presently prefers to use anodizing methods in accordance with specifications promulgated by the military to govern aluminum anodizing used in the aerospace industry, most preferably in accordance with specification MIL-A-8625, Type 3, Class 1 or Class 2. In addition, it is preferable that a polyester or DACRON type surface material 14 is placed around the mandrel 10 before the composite material is applied.

In accordance with the above, a preferred method for facilitating removal of a mandrel in the manufacture of hollow composite structures comprises the steps of:

(a) selecting a mandrel having a composition and coefficient of thermal expansion sufficient to enable said mandrel to expand when subjected to an elevated temperature;

(b) preheating the mandrel to at least a predetermined minimum elevated temperature to thereby expand said mandrel radially outwardly;

(c) winding composite material around the mandrel while said mandrel has a temperature of at least said predetermined minimum elevated temperature;

(d) curing the composite material;

(e) cooling the mandrel to thereby contract said mandrel radially inwardly; and (f) removing the mandrel from the composite material.

These method steps (a)–(f) above may be augmented in several ways, including the following ways:

Step (a) may further comprise selecting a mandrel having a higher coefficient of thermal expansion than the composite material.

Step (a) may further comprise selecting a mandrel having a length greater than fifteen feet, and step (c) may further comprise forming a hollow composite structure on the mandrel having a length greater than fifteen feet.

Step (a) may further comprise selecting a hollow, cylindrical mandrel having an outer diameter, and a tubular wall thickness within a range of approximately 0.05 and 0.15 of said outer diameter.

Step (e) may further comprises advancing a cooling liquid through the hollow mandrel and contacting an interior surface of said mandrel with said liquid to thereby remove heat from said mandrel.

Step (a) may further comprise selecting an aluminum mandrel having an aluminum exterior surface defining a first circumference and anodizing said exterior surface to thereby harden said exterior surface.

Step (a) may further comprise selecting a mandrel having a substantially constant outer diameter.

Step (b) may further comprise preheating the mandrel to a temperature within a range of approximately 180° F. to 240° F.

Step (b) may further comprise enlarging the aluminum exterior surface of the mandrel to a second, larger circumference.

Step (c) may further comprise winding composite material around the enlarged exterior surface using a winding technique to thereby form a hollow composite member having a first length, such that a larger amount of composite material is utilized in forming said hollow composite member about the second, larger circumference than would have been utilized if said composite material had been wound about the first circumference of the aluminum exterior surface using said winding technique to form a hollow composite member having the same first length.

Step (e) may further comprise shrinking the aluminum exterior surface of the mandrel to a smaller circumference than the second, larger circumference.

Step (b) may further comprise enlarging the mandrel without utilizing an applied force to accomplish said enlarging. Such an "applied force" as referenced herein shall refer broadly to any external force that might be applied into direct contact with a mandrel to enlarge it.

Step (b) may further comprise enlarging the mandrel radially outwardly to a second, larger outer diameter without utilizing fluidic pressure to accomplish said enlarging. Such "fluidic pressure" as referenced herein shall refer broadly to any gaseous or liquid pressure that might be applied hydraulically or otherwise, such as to inflate a mandrel bladder radially outwardly.

The mandrel 10 is preferably preheated to a minimum elevated temperature of 120° F. (Fahrenheit), more preferably within a range of approximately 120° F. to 400° F., and most preferably within a range of approximately 200° F. to 220° F. The composite 12 may be oven cured, or cured utilizing heatlights configured in a rotisserie formation as known to those of ordinary skill in the art. Further, the concept of a constant diameter as referenced herein shall refer broadly to mandrels having substantially (but not perfectly) constant outer diameters, including a diameter tolerance of "plus or minus" 0.003 inches.

Applicant notes that the thinking in the field has been to utilize steel mandrels for constructing composite tubes, not aluminum. Aluminum is thought to be too soft for the rigors of repeated application and curing of composite material, and the anodizing procedure strikes some as being inhibiting to the expansion process and potentially frustrating to the purposes of the invention. However, applicant's conception of the invention as described herein, and as applied in the field, has shown otherwise.

It is to be understood that although thermally expanding a metal mandrel is preferred, the invention is much broader than that. Any suitable procedure for expanding a mandrel of metallic composition is within the scope of the present invention. Applicant also notes that a key aspect of the invention is to avoid expanding the mandrel into already-wound composite, thereby stretching the composite radially outwardly and locking it upon the mandrel, regardless of whether the mandrel is thereafter shrunk to aid in its removal.

It is further to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method for facilitating removal of a mandrel in the manufacture of hollow composite structures, said method comprising the steps of:
    (a) selecting a mandrel having a composition and coefficient of thermal expansion sufficient to enable said mandrel to expand when subjected to an elevated temperature;
    (b) preheating the mandrel to at least a predetermined minimum elevated temperature thereby expanding said mandrel radially outwardly to provide an expanded mandrel;
    (c) winding composite material around the expanded mandrel while said expanded mandrel has a temperature of at least said predetermined minimum elevated temperature;
    (d) curing the composite material without stretching said composite material during said curing to provide a cured composite material;
    (e) cooling the expanded mandrel thereby contracting said expanded mandrel radially inwardly to provide a contracted mandrel; and
    (f) removing the contracted mandrel from the cured composite material.

2. The method of claim 1, wherein said step of selecting said mandrel in step (a) further comprises selecting said mandrel having said coefficient of thermal expansion higher than that of the cured composite material.

3. The method of claim 1, wherein said step of selecting said mandrel in step (a) further comprises selecting said mandrel having a length greater than ten feet, and wherein step (c) further comprises forming a hollow composite structure having a length greater than ten feet on the expanded mandrel.

4. The method of claim 1, wherein said step of selecting said mandrel in step (a) further comprises selecting said mandrel having a length greater than fifteen feet, and wherein step (c) further comprises forming a hollow composite structure having a length greater than fifteen feet on the expanded mandrel.

5. The method of claim 1, wherein said step of selecting said mandrel in step (a) further comprises selecting said mandrel having a length greater than twenty-five feet, and wherein step (c) further comprises forming a hollow composite structure having a length greater than twenty-five feet on the expanded mandrel.

6. The method of claim 1, wherein said step of selecting said mandrel in step (a) further comprises selecting a hollow, cylindrical mandrel.

7. The method of claim 6, wherein said step of selecting said mandrel in step (a) further comprises selecting said mandrel having an outer diameter, and a tubular wall thickness within a range of approximately 0.05 and 0.15 of said outer diameter.

8. The method of claim 6, wherein said step of cooling said mandrel in step (e) comprises advancing a cooling liquid through the hollow cylindrical mandrel and contacting an interior surface of said hollow cylindrical mandrel with said cooling liquid to thereby remove heat from said hollow cylindrical mandrel.

9. The method of claim 1, wherein said step of selecting said mandrel in step (a) further comprises selecting an aluminum mandrel having an exterior surface and anodizing said exterior surface to thereby harden said exterior surface.

10. The method of claim 1, wherein said step of selecting said mandrel in step (a) further comprises selecting a mandrel having a substantially constant outer diameter.

11. The method of claim 1, wherein said step of preheating said mandrel in step (b) comprises preheating the mandrel to said minimum elevated temperature within a range of approximately 120° F. to 400° F.

12. The method of claim 11, wherein said step of preheating said mandrel in step (b) comprises preheating the mandrel to said minimum elevated temperature within a range of approximately 200° F. to 220° F.

13. The method of claim 1, wherein said step of selecting said mandrel in step (a) comprises selecting a mandrel having an exterior surface consisting entirely of metal, wherein said exterior surface defines a first circumference.

14. The method of claim 13:
    wherein said step of expanding the mandrel radially outwardly in step (b) further comprises enlarging the metal exterior surface of the mandrel to a second, larger circumference; and
    wherein said step of winding composite material in step (c) further comprises winding said composite material around the expanded mandrel using a winding technique to thereby form a hollow composite member having a first length, such that a larger amount of composite material is utilized in forming said hollow composite member about the second, larger circumference than would have been utilized if said composite material had been wound about the first circumference of the metal exterior surface using said winding technique to form a hollow composite member having the same first length.

15. The method of claim 1, wherein said step of contracting said mandrel in step (e) comprises shrinking the mandrel to a smaller circumference and thereby producing a radial separation space between the contracted mandrel and the cured composite material.

16. The method of claim 1, wherein said mandrel in step (a) comprises an unexpanded mandrel, said method further comprising the following step:
(g) wrapping the expanded mandrel with a surface material comprising polyester, prior to step (c).

17. The method of claim 10, wherein said step of removing said mandrel in step (f) comprises removing the mandrel by hand, without using mechanical extraction devices.

18. A method for facilitating removal of a mandrel in the manufacture of hollow composite structures, said method comprising the steps of:
(a) selecting an unexpanded mandrel having a composition and coefficient of thermal expansion sufficient to enable said mandrel to expand when subjected to an elevated temperature;
(b) preheating the mandrel to at least a predetermined minimum elevated temperature thereby expanding said mandrel radially outwardly to provide an expanded mandrel;
(c) winding composite material around the expanded mandrel while said expanded mandrel has a temperature of at least said predetermined minimum elevated temperature;
(d) curing the composite material without stretching said composite material during said curing to provide a cured composite material;
(e) cooling the expanded mandrel thereby contracting said expanded mandrel radially inwardly to provide a contracted mandrel;
(f) removing the contracted mandrel from the cured composite material by hand, without using mechanical extraction devices;
(g) wrapping the expanded mandrel with a surface material comprising polyester, prior to step (c);
wherein said step of selecting said mandrel in step (a) further comprises selecting said mandrel having said coefficient of thermal expansion higher than that of the cured composite material;
wherein said step of selecting said mandrel in step (a) comprises selecting said mandrel having a length greater than fifteen feet, and wherein step (c) further comprises forming a hollow composite structure having a length greater than fifteen feet on the mandrel;
wherein said step of selecting said mandrel in step (a) comprises selecting a hollow, cylindrical mandrel having an outer diameter, and a tubular wall thickness within a range of approximately 0.05 and 0.15 of said outer diameter;
wherein said step of cooling said mandrel in step (e) comprises advancing a cooling liquid through the hollow cylindrical mandrel and contacting an interior surface of said hollow cylindrical mandrel with said liquid to thereby remove heat from said mandrel;
wherein said step of selecting said mandrel in step (a) comprises selecting an aluminum mandrel having an aluminum exterior surface defining a first circumference and anodizing said exterior surface to thereby harden said exterior surface;
wherein said step of selecting said mandrel in step (a) further comprises selecting a mandrel having a substantially constant outer diameter;
wherein said step of preheating said mandrel in step (b) further comprises preheating the mandrel to said minimum elevated temperature within a range of approximately 180° F. to 240° F.;
wherein said step of expanding the mandrel radially outwardly in step (b) comprises enlarging the aluminum exterior surface of the mandrel to a second, larger circumference; and
wherein said step of winding said composite material in step (c) comprises winding said composite material around the expanded mandrel using a winding technique to thereby form a hollow composite member having a first length, such that a larger amount of composite material is utilized in forming said hollow composite member about the second, larger circumference than would have been utilized if said composite material had been wound about the first circumference of the aluminum exterior surface using said winding technique to form a hollow composite member having the same first length.

19. A method for facilitating removal of a mandrel in the manufacture of hollow composite structures, said method comprising the steps of:
(a) selecting a mandrel having an exterior surface consisting of a metal exterior surface, wherein said metal exterior surface defines a first circumference;
(b) enlarging the metal exterior surface of the mandrel to a second, larger circumference to provide an expanded mandrel having an enlarged exterior surface;
(c) winding composite material around the enlarged exterior surface using a winding technique to thereby form a hollow composite member having a first length, such that a larger amount of composite material is utilized in forming said hollow composite member about the second, larger circumference than would have been utilized if said composite material had been wound about the first circumference of the metal exterior surface using said winding technique to form a hollow composite member having the same first length;
(d) curing the composite material without stretching said composite material during said curing;
(e) shrinking the metal exterior surface of the expanded mandrel to a smaller circumference than the second, larger circumference to provide a contracted mandrel; and
(f) removing the contracted mandrel from the composite material.

20. The method of claim 19:
wherein said step of selecting said mandrel in step (a) further comprises selecting a mandrel having a composition and coefficient of thermal expansion sufficient to enable said mandrel to expand when subjected to an elevated temperature;
wherein said mandrel in step (b) comprises an unexpanded mandrel and wherein said step of enlarging said metal exterior surface in step (b) further comprises preheating the unexpanded mandrel to at least a predetermined minimum elevated temperature thereby providing said expanded mandrel having said enlarged exterior surface; and
wherein said step of winding in step (c) further comprises winding said composite material around the expanded mandrel while said expanded mandrel has a temperature of at least said predetermined minimum elevated temperature.

21. The method of claim 19, wherein said step of selecting a mandrel in step (a) comprises selecting said mandrel to consist entirely of metal.

22. The method of claim 19, wherein said step of selecting a mandrel in step (a) comprises selecting a hollow, cylindrical mandrel having an outer diameter, and a tubular wall thickness within a range of approximately 0.05 and 0.15 of said outer diameter.

23. The method of claim 19, wherein said step of selecting a mandrel in step (a) comprises selecting an aluminum mandrel and anodizing said metal exterior surface to thereby harden said metal exterior surface.

24. The method of claim 19, wherein said step of selecting a mandrel in step (a) further comprises selecting said mandrel having a substantially constant outer diameter.

25. A method of making hollow composite structures, said method comprising the steps of:
   (a) selecting a mandrel having an exterior surface consisting of a metal exterior surface, wherein said metal exterior surface defines a first circumference;
   (b) enlarging the metal exterior surface of the mandrel to a second, larger circumference to provide an expanded mandrel having an enlarged exterior surface;
   (c) winding composite material around the enlarged exterior surface using a winding technique to thereby form a hollow composite member having a first length, such that a larger amount of composite material is utilized in forming said hollow composite member about the second, larger circumference than would have been utilized if said composite material had been wound about the first circumference of the metal exterior surface using said winding technique to form a hollow composite member having the same first length;
   (d) curing the composite material without stretching the composite material during said curing; and
   (e) removing the mandrel from the composite material.

26. The method of claim 25:
   wherein said mandrel in step (a) comprises an unexpanded mandrel, and wherein said step of selecting a mandrel in step (a) further comprises selecting said unexpanded mandrel having a composition and coefficient of thermal expansion sufficient to enable said unexpanded mandrel to expand when subjected to an elevated temperature;
   wherein said step of enlarging said metal exterior surface in step (b) further comprises preheating the unexpanded mandrel to at least a predetermined minimum elevated temperature to thereby expand said unexpanded mandrel radially outwardly; and
   wherein said step of winding composite material in step (c) further comprises winding said composite material around the expanded mandrel while said expanded mandrel has a temperature of at least said predetermined minimum elevated temperature.

27. The method of claim 26, wherein said step of selecting a mandrel in step (a) comprises selecting a hollow, cylindrical mandrel having an outer diameter, and a tubular wall thickness within a range of approximately 0.05 and 0.15 of said outer diameter.

28. The method of claim 25, wherein said step of selecting a mandrel in step (a) comprises selecting an aluminum mandrel having an exterior surface and anodizing said exterior surface to thereby harden said exterior surface.

29. The method of claim 25, wherein said step of selecting a mandrel in step (a) further comprises selecting said unexpanded mandrel having a substantially constant outer diameter.

30. A method for facilitating removal of a mandrel in the manufacture of hollow composite structures, said method comprising the steps of:
   (a) selecting a mandrel having a first outer diameter;
   (b) enlarging the mandrel radially outwardly to a second, larger outer diameter without utilizing fluidic pressure to accomplish said enlarging to provide an enlarged mandrel;
   (c) winding composite material around the enlarged mandrel;
   (d) curing the composite material without stretching said composite material during said curing;
   (e) shrinking the mandrel radially inwardly to a smaller diameter than the second, larger diameter;
   (f) removing the mandrel from the composite material.

31. The method of claim 30:
   wherein said mandrel in step (a) comprises an unexpanded mandrel and wherein said step of selecting a mandrel in step (a) further comprises selecting said unexpanded mandrel having a composition and coefficient of thermal expansion sufficient to enable said unexpanded mandrel to expand when subjected to an elevated temperature;
   wherein said step of enlarging the mandrel in step (b) further comprises preheating the unexpanded mandrel to at least a predetermined minimum elevated temperature to thereby expand said unexpanded mandrel radially outwardly; and
   wherein said step of winding composite material in step (c) further comprises winding said composite material around the enlarged mandrel while said enlarged mandrel has a temperature of at least said predetermined minimum elevated temperature.

32. The method of claim 30, wherein said step of selecting a mandrel in step (b) comprises enlarging the mandrel without utilizing an applied force to accomplish said enlarging.

33. The method of claim 30, wherein said step of selecting a mandrel in step (a) further comprises selecting a hollow, cylindrical mandrel having an outer diameter, and a tubular wall thickness within a range of approximately 0.05 and 0.15 of said outer diameter.

34. The method of claim 30, wherein said step of selecting a mandrel in step (a) comprises selecting an aluminum mandrel having an exterior surface and anodizing said exterior surface to thereby harden said exterior surface.

35. The method of claim 30, wherein said step of selecting a mandrel in step (a) comprises selecting said mandrel having a substantially constant outer diameter.

36. A method for facilitating removal of a mandrel in the manufacture of hollow composite structures, said method comprising the steps of:
   (a) selecting a mandrel having a composition and coefficient of thermal expansion sufficient to enable said mandrel to expand when subjected to an elevated temperature;
   (b) preheating the mandrel to at least a predetermined minimum elevated temperature to thereby expanding said mandrel radially outwardly to provide an expanded mandrel;
   (c) winding composite material around the expanded mandrel while said expanded mandrel has a temperature of at least said predetermined minimum elevated temperature;
   (d) curing the composite material without further expanding the mandrel during said curing to provide a cured composite material;
   (e) cooling the expanded mandrel to thereby contracting said expanded mandrel radially inwardly to provide a contracted mandrel; and
   (f) removing the contracted mandrel from the cured composite material.

* * * * *